United States Patent
Boss et al.

(10) Patent No.: US 8,214,843 B2
(45) Date of Patent: Jul. 3, 2012

(54) FRAMEWORK FOR DISTRIBUTION OF COMPUTER WORKLOADS BASED ON REAL-TIME ENERGY COSTS

(75) Inventors: Gregory J. Boss, American Fork, UT (US); James R. Doran, New Milford, CT (US); Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 973 days.

(21) Appl. No.: 12/203,329

(22) Filed: Sep. 3, 2008

(65) Prior Publication Data

US 2010/0058350 A1    Mar. 4, 2010

(51) Int. Cl.
*G06F 9/50* (2006.01)

(52) U.S. Cl. ......................................... 718/106; 718/104

(58) Field of Classification Search .................. None
See application file for complete search history.

(56) References Cited

U.S. PATENT DOCUMENTS

| | | | |
|---|---|---|---|
| 6,598,029 B1 | 7/2003 | Johnson et al. | |
| 6,631,309 B2 | 10/2003 | Boies et al. | |
| 6,785,592 B1 | 8/2004 | Smith et al. | |
| 7,171,287 B2 | 1/2007 | Weiss | |
| 7,549,069 B2* | 6/2009 | Ishihara et al. | 713/320 |
| 7,716,006 B2* | 5/2010 | Coskun et al. | 702/132 |
| 2003/0217090 A1* | 11/2003 | Chauvel et al. | 709/102 |
| 2004/0098142 A1 | 5/2004 | Warren et al. | |
| 2004/0254899 A1 | 12/2004 | Abe et al. | |
| 2005/0076043 A1* | 4/2005 | Benedetti et al. | 707/100 |
| 2005/0096797 A1* | 5/2005 | Matsubara et al. | 700/291 |
| 2005/0125701 A1* | 6/2005 | Hensbergen et al. | 713/320 |
| 2005/0165512 A1 | 7/2005 | Peljto | |
| 2005/0228618 A1* | 10/2005 | Patel et al. | 702/188 |
| 2008/0184230 A1* | 7/2008 | Leech et al. | 718/100 |

* cited by examiner

*Primary Examiner* — Eric Coleman
(74) *Attorney, Agent, or Firm* — Patrick J. Daugherty; Driggs, Hogg, Daugherty & Del Zoppo Co., LPA

(57) ABSTRACT

Energy costs for conducting compute tasks at diverse data center sites are determined and are then used to route such tasks in a most efficient manner. A given compute task is first evaluated to predict potential energy consumption. The most favorable real-time energy costs for the task are determined at the various data center sites. The likely time period of the more favorable cost as well as the stability at the data center are additional factors. A workload dispatcher then forwards the selected compute task to the data center having the most favorable real-time energy costs. Among the criteria used to select the most favorable data center is a determination that the proposed center presently has the resources for the task.

24 Claims, 2 Drawing Sheets

FRAMEWORK FOR DISTRIBUTION OF COMPUTER WORKLOADS BASED ON REAL-TIME ENERGY COSTS

FIELD OF THE INVENTION

A framework for automatic distribution of computer workloads based on real time energy costs is described. Furthermore, the overall management system and policies for such computational workload distributions is discussed.

BACKGROUND OF THE INVENTION

Currently, computing workloads are processed within relatively static data centers. Disaster recovery mechanisms exist to transfer data or processing to an alternate site based on an outage at an original data center location. The power costs relating to information technology (IT) have been steadily increasing, causing some experts to predict that power costs will soon overtake computer hardware costs.

Grid computing enables the distribution of compute workloads based on available resources. It does not include methods for the determination of processing location based on real-time energy costs.

Equipment power needs are a significant burden for corporate IT budgets. Many servers are underutilized, indicating that processing capacity may exist in locations with lower energy costs. Not utilizing this capacity causes unnecessary incurred expense for organizations using status quo redistribution techniques.

SUMMARY OF INVENTION

This invention relates to a framework for dynamically shifting compute workloads among sites based on real-time energy costs.

This invention also provides for dynamically shifting compute workloads among locations. A distribution hub, referred to as a workload dispatcher, may be used to provide the workload management functionality. This enables flexible addition, removal, or reassignment of infrastructure components such as data centers, energy providers, management policies and communications methods, among others.

In greater detail, the invention relates to a system and method for dynamically shifting compute workloads among data center sites based on real-time energy costs. An evaluator is used to determine potential energy consumption for at least one compute task. Then, a determination is made as to which of the data center sites provides the most favorable real-time energy costs. This is followed by a workload dispatcher forwarding a compute task to a given data center site based upon the determination of the most favorable real-time energy costs.

The invention relates to a computer-readable medium containing instructions, when implemented on a computer, for shifting a compute workload among data center sites based on real-time energy costs. The invention also relates to a computer product including the medium on which the instructions are recorded.

Likewise, the present invention includes the deployment and management by a service provider, such as an electric utility, of the method for dynamically shifting compute workloads among data center sites based on real-time energy costs to provide information technology cost saving services for its customers or clients.

BRIEF DESCRIPTION OF THE DRAWING

These and other features of this invention will be more readily understood from the following detailed description of the various aspects of the invention taken in conjunction with the accompanying drawings in which.

The drawings are not intended to be drawn to scale. Instead, the drawings are merely a schematic representation, and are not intended to portray specific parameters of the invention. The drawings are intended to depict only typical embodiments of the invention, and therefore should not be considered as limiting the scope of the invention.

DETAILED DESCRIPTION OF THE INVENTION

Figure 1:
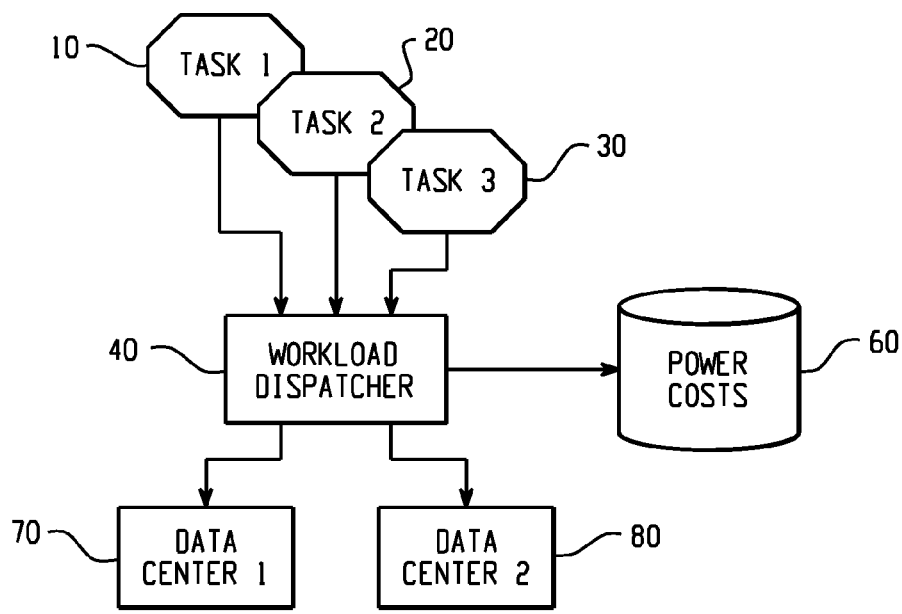
FIG. 1 represents a dispatch hub of the present invention.

More specifically, FIG. 1 illustrates a workload dispatcher 40 which may be used to calculate and compare power costs and then route jobs to the best location based on the comparison. This dispatcher tracks jobs to ensure completion, and reroutes jobs in the event of a failure at one location. Multiple tasks 1, 2 and 3 identified as 10, 20 and 30 in the drawing all submit compute jobs to the workload dispatcher 40. The dispatcher requests power costs at 60, and determines whether data center 1 (70) or data center 2 (80) would provide service at the most reasonable price.

The framework may also set standard APIs (application programming interfaces) and protocols for communication among the workload dispatcher, power providers, data centers and any other entities.

The work of calculating costs, comparing locations and dispatching work may be performed in different ways, including those listed below. A preferred embodiment would allow for much of the analysis to be done by the workload dispatcher to ensure consistent methods are used. However, such analysis could be accomplished:

Solely by the workload dispatcher;
Shared by the workload dispatcher and the individual data centers;
Shared by the workload dispatcher and other parties.

Figure 2:
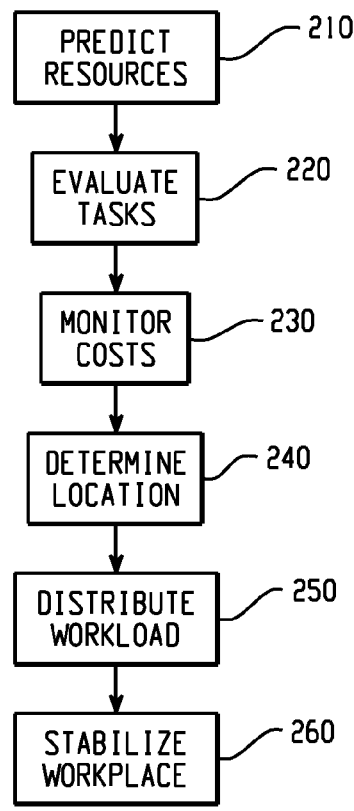
FIG. 2 is a process flow of the workload distribution management.

FIG. 2 depicts the steps of the high-level steps for management of the workload distribution according to the present invention. These steps define the procedure for the automatic distribution of compute workloads based on power costs:

Predefine Available Computational Resources 210
Evaluate Compute Processing Tasks 220
Monitor Power Costs 230
Determine Optimum Location 240
Distribute or Relocate Workload 250
Stabilize Workload 260

These steps are defined in greater detail herein below.

1. Predefine Available Computational Resources

The first step 210 predicts or predefines the data center(s) and computational resources available for accepting workloads.

2. Evaluate Compute Processing Tasks

In the second step 220, the compute processing tasks which are capable of being relocated are evaluated. Compute workloads are often divided into real-time and queued/batch. This framework may be used for either type of workload.

a) Real time: Detect real-time jobs available for relocation.
b) Queued: A system catalogs each job as it is queued or created and stores those metrics about the job's hardware prerequisites in a database. The system queries the database to locate jobs most suited to relocate.

Table 1 below illustrates one of the tables that may be used by the workload dispatcher to maintain the job queue.

TABLE 1

Job Queue Management Table

| JOB | TOTAL TRX REQUIRED | JOB STATUS | ENERGY PROVIDER | LOCATION |
|---|---|---|---|---|
| A | 20,000 | In queue, awaiting dispatch | To be determined | To be determined |
| B | 18,500 | In queue, awaiting dispatch | To be determined | To be determined |
| C | 1,200 | In process | ABC Co. | Denver, Colo. |
| D | 500 | In process | XYZ Co. | San, Jose, CA |
| E | 3,780 | Complete, awaiting removal from queue | ABC Co. | San Jose, CA |
| F | 5,020 | Job failed, rerouting | To be determined | To be determined |

3. Monitor Power Costs

The power costs are monitored in the next step 230 at the respective data centers in real time, or based upon predefined schedules.

4. Determine Optimum Location

The method in step 240 will consider a threshold for cost differential and an element of time in determining the optimum location to run a compute job. For example, it may move the workload if a one cent (1 ¢) differential in price per watt lasts for three weeks, whereas it may not move it if it lasts for only one hour.

Cost Evaluation Steps—New Job Distribution

Determine the cost per watt, the duration of that cost per watt, the length of time a job will run;

Consider the cost of running the job in each possible location;

Select data center with lowest cost;

Revaluate redistribution as often as energy costs change.

Cost Evaluation Steps—Existing Job Relocation

Relocation of an existing workload will also need to consider the additional overhead cost of relocation.

1. Determine the cost per unit of electrical power such as a watt, the duration of that cost per each unit, the length of time a job will run and a cost for the relocation of a compute job;

2. Additionally, consider user defined thresholds;

3. Consider the steady state cost of a job for a specified time period and subtract the (reduced) cost for that job to run in another data center; then add the cost to relocate it (time delays, energy to relocate, etc. . . . );

4. If the new cost is below a percentage or other threshold value, then relocate the job; and 5. Revaluate redistribution as often as energy costs change.

Workload distribution may be determined with trade-offs among the following:

Intra datacenter

Inter datacenter

5. Distribute or Relocate Workload

Workload is shifted at 250 between data centers based upon lowest cost decision. Distribution may include new compute workloads or relocation of existing workloads:

New Workload Distribution Sample Steps:

1. Determine infrastructure capabilities/capacities/costs
2. Determine power requirements of workload
3. Add workload to queue
4. Distribute work to lowest cost location
5. Ensure work completion, manage error cases Existing Workload Redistribution Existing workloads to be relocated will also need to be halted and brought to a quiescent state before relocation.

6. Stabilize Workload

In the last step 260, the workload is stabilized for some period of time to prevent thrashing, then resumes the aforementioned steps.

Prevention of Thrashing: Constantly moving workloads can cause an inefficient thrashing scenario. Thrash is the term used to describe a degenerate situation on a computer where increasing resources are used to do a decreasing amount of work. This invention includes methods to ensure workload is distributed efficiently and avoids thrashing. This is achieved by:

Setting a minimum amount of time for a workload to remain stable before moving, or Setting a specific task to be completed in a given location with a maximum number of moves.

Job Checkpoint Restart: In some instances, a job may not be able to be completed in the designated location. In these cases, the framework may initiate known or future "checkpoint-restart" methods to relocate the job without having to start over. Such a method may employ a scenario such as the following: First, a five day compute job is sent to a data center in San Jose, Calif. After day two, San Jose increases its rates dramatically. The job is paused and relocated to Denver, Colo. to complete remaining three days of processing.

This invention provides a business method that performs the workload dispatch services on a subscription, advertising and/or fee basis. Thus, for example, a service provider can offer to provide information technology cost savings for its clientele in exchange for consideration to be negotiated by and between the server and individual or collective clients.

Computerized Implementation

Figure 3:
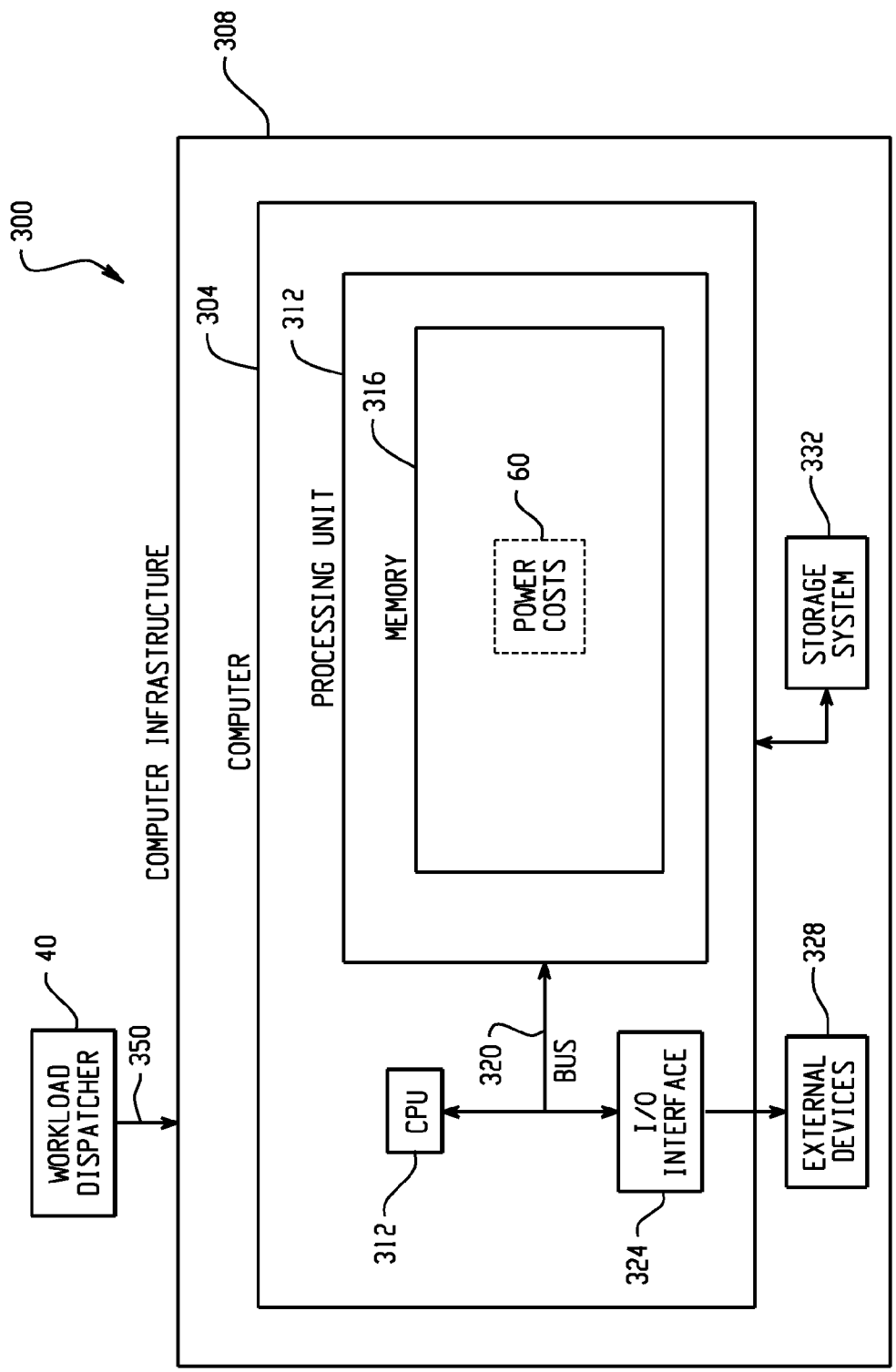
FIG. 3 is a block diagram illustrating an exemplary computerized system and method for implementing the present invention.

Referring now to FIG. 3, an exemplary computerized implementation of the invention comprises a system 300 that communicates with the workload dispatcher 40 through an interface 350. The system includes a computer 304 deployed within a computer infrastructure 308 such as one existing at the information technology center of a business firm, a manufacturing company, service provider or governmental agency. Thus, FIG. 3 is intended to demonstrate, among other things, that the present invention could be implemented within a network environment (e.g., the Internet, a wide area network (WAN), a local area network (LAN), a virtual private network (VPN), etc.), or on a stand-alone computer system.

In the case of the internet, communication throughout the network can occur via any combination of various types of communication links. For example, the communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the computer infrastructure 308 is intended to demonstrate that some or all of the components of implementation could be deployed, managed, serviced, etc. by a service provider who offers to implement, deploy, and/or perform the functions of the present invention for others.

As shown, the computer 304 includes a processing unit 312, a memory 316, a bus 320, and input/output (I/O) interfaces 324. Further, the computer 304 is shown in communication with external I/O devices/resources 328 and storage system 332. In general, the processing unit 312 executes computer program code, such as the code to implement various components of the system 300, which is stored in memory 316 and/or storage system 332. It is to be appreciated that two or more, including all, of these components may be implemented as a single component. The memory may also contain the various power costs 60 that the workload dispatcher 40 relies on to make its allocation decisions.

While executing computer program code, the processing unit 312 can read and/or write data to/from the memory 316, the storage system 332, and/or the I/O interfaces 324. The bus 320 provides a communication link between each of the components in computer 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of such infrastructures available for implementing the invention. For example, in one embodiment, the computer infrastructure 308 comprises two or more computing devices (e.g., a server cluster) that communicate over a network to perform the various process steps of the invention. Moreover, the computer 304 is only representative of various possible computers that can include numerous combinations of hardware.

To this extent, in other embodiments, computer 304 can comprise any specific purpose-computing article of manufacture comprising hardware and/or computer program code for performing specific functions, any computing article of manufacture that comprises a combination of specific purposes and general-purpose hardware/software, or the like. In each case, the program code and hardware can be created using standard programming and engineering techniques, respectively.

Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external devices 328. Still further, it is understood that one or more additional components (e.g., system software, math co-processing unit, etc.) not shown in FIG. 3 can be included in computer 304. However, if the computer 304 comprises a handheld device or the like, it is understood that one or more of the external devices 328 (e.g., a display) and/or the storage system 332 could be contained within the system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). Also, although not shown, additional components, such as cache memory, communication systems, system software, etc., may be incorporated into computer 304.

Shown in the memory 316 of computer 304 is the processing unit 312 which includes the components and performs the functions discussed above. In the illustrated embodiment, the computer 304 communicates with external devices 328 such as the workload dispatcher 40 or another computing system, over a path which may be a wired bus 320 (as shown) or wireless.

While shown and described herein as a method and a system, it is understood that the invention further provides various alternative embodiments. For example, in one embodiment, the invention provides a computer-readable/useable medium that includes computer program code to enable a computer infrastructure to perform the process steps of the invention. To this extent, the computer-readable/useable medium includes program code that implements each of the various process steps of the invention.

It is understood that the terms a "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), or on one or more data storage portions of a computing device, such as the memory 316 and/or the storage system 332 (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to manage the system 300. In this case, the service provider can create, maintain, and support a computer infrastructure, such as the computer infrastructure 308 that performs the process steps of the invention, for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the system 300. In this case, computer infrastructure 308 can be provided and one or more systems for performing the process steps of the invention (such as the steps shown in FIG. 2) can be obtained (e.g., created, purchased, used, modified, etc.) and deployed to the computer infrastructure. To this extent, the deployment of a system can comprise one or more of: (1) installing program code on a computing device, such as computer 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for dynamically shifting compute workloads among data center sites based on real-time energy costs, the method comprising:

evaluating via a processing unit a compute processing task of a compute workload that is capable of being relocated to determine a potential energy consumption needed in watts and a length of time needed to perform the compute task;

determining for each of a plurality of available data center sites respective energy prices per watt of energy provided by the sites and time durations for each of the respective energy prices, via the processing unit; and relocating via the processing unit the compute task to a second data center site of the plurality of data center sites having a lowest energy price from a first of the data center sites that the compute job is assigned to if:

a total cost to relocate the compute job to the second site and complete the compute job at the second site energy price is lower than a cost to complete the compute job at the first site energy price;

the second site time energy price duration is long enough to complete the compute task if moved to the second site; and the compute job workload of the first site will remain stable for a minimum required thrashing prevention threshold amount of time after moving the compute job to the second site; or moving the compute job to the second site will not exceed a specified threshold maximum number of moves for the compute job.

2. The method according to claim 1 further comprising:
halting and bringing the compute job to a quiescent state before relocating the compute job to the second site.

3. The method according to claim 2, further comprising:
relocating the compute job to the second site if the compute job is not able to be completed at the first site, by pausing the compute job and completing a remainder of the compute job at the second site after the relocating.

4. The method according to claim 3, including choosing the second site as a function of determining the second site is an optimum data center location for conducting the compute task.

5. The method according to claim 4, wherein the relocating the compute job to the second site is further including a function of stabilizing the workload among the data center sites.

6. The method according to claim 4, further comprising:
re-evaluating the relocation of the compute task as often as energy costs change at any of the plurality of data sites.

7. A method for effecting compliance with power usage specifications through positive feedback, the method comprising:

integrating computer-readable program code into a computer system comprising a processing unit, a computer readable memory and a computer readable tangible storage device, wherein the computer readable program code is embodied on the computer readable tangible storage device and comprises instructions that, when executed by the processing unit via the computer readable memory, cause the processing unit to:

evaluate a compute processing task of a compute workload that is capable of being relocated to determine a potential energy consumption needed in watts and a length of time needed to perform the compute task;

determine for each of a plurality of available data center sites respective energy prices per watt of energy provided by the sites and time durations for each of the respective energy prices; and relocate the compute task to a second data center site of the plurality of data center sites having a lowest energy price from a first of the data center sites that the compute job is assigned to if:

a total cost to relocate the compute job to the second site and complete the compute job at the second site energy price is lower than a cost to complete the compute job at the first site energy price;

the second site time energy price duration is long enough to complete the compute task if moved to the second site; and the compute job workload of the first site will remain stable for a minimum required thrashing prevention threshold amount of time after moving the compute job to the second site; or moving the compute job to the second site will not exceed a specified threshold maximum number of moves for the compute job.

8. The method of claim 7, wherein the computer readable program code instructions, when executed by the computer processing unit, further cause the computer processing unit to halt and bring the compute job to a quiescent state before relocating the compute job to the second site.

9. The method of claim 8, wherein the computer readable program code instructions, when executed by the computer processing unit, further cause the computer processing unit to relocate the compute job to the second site if the compute job is not able to be completed at the first site, by pausing the compute job and completing a remainder of the compute job at the second site after the relocating.

10. The method of claim 9, wherein the computer readable program code instructions, when executed by the computer processing unit, further cause the computer processing unit to choose the second site as a function of determining the second site is an optimum data center location for conducting the compute task.

11. The method of claim 10, wherein the computer readable program code instructions, when executed by the computer processing unit, further cause the computer processing unit to relocate the compute job to the second site as a function of stabilizing the compute task workload among the plurality data center sites.

12. The method of claim 11, wherein the computer readable program code instructions, when executed by the computer processing unit, further cause the computer processing unit to re-evaluate the relocation of the compute task as often as energy costs change at any of the plurality of data sites.

13. A system, comprising:
a processing unit in communication with a computer readable memory and a tangible computer-readable storage device;
wherein the processing unit, when executing program instructions stored on the tangible computer-readable storage device via the computer readable memory:

evaluates a compute processing task of a compute workload that is capable of being relocated to determine a potential energy consumption needed in watts and a length of time needed to perform the compute task;

determines for each of a plurality of available data center sites respective energy prices per watt of energy provided by the sites and time durations for each of the respective energy prices; and relocates the compute task to a second data center site of the plurality of data center sites having a lowest energy price from a first of the data center sites that the compute job is assigned to if:
a total cost to relocate the compute job to the second site and complete the compute job at the second site energy price is lower than a cost to complete the compute job at the first site energy price;
the second site time energy price duration is long enough to complete the compute task if moved to the second site; and
the compute job workload of the first site will remain stable for a minimum required thrashing prevention threshold amount of time after moving the compute job to the second site; or
moving the compute job to the second site will not exceed a specified threshold maximum number of moves for the compute job.

14. The system of claim 13, wherein the computer readable program code instructions, when executed by the computer processing unit, further cause the computer processing unit to halt and bring the compute job to a quiescent state before relocating the compute job to the second site.

15. The system of claim 14, wherein the computer readable program code instructions, when executed by the computer processing unit, further cause the computer processing unit to relocate the compute job to the second site if the compute job is not able to be completed at the first site, by pausing the compute job and completing a remainder of the compute job at the second site after the relocating.

16. The system of claim 15, wherein the computer readable program code instructions, when executed by the computer processing unit, further cause the computer processing unit to choose the second site as a function of determining the second site is an optimum data center location for conducting the compute task.

17. The system of claim 15, wherein the computer readable program code instructions, when executed by the computer processing unit, further cause the computer processing unit to relocate the compute job to the second site as a function of stabilizing the compute task workload among the plurality data center sites.

18. The system of claim 17, wherein the computer readable program code instructions, when executed by the computer processing unit, further cause the computer processing unit to re-evaluate the relocation of the compute task as often as energy costs change at any of the plurality of data sites.

19. An article of manufacture, comprising:
a computer readable tangible storage device having computer readable program code embodied therewith, the computer readable program code comprising instructions that, when executed by a computer processing unit, cause the computer processing unit to:
evaluate a compute processing task of a compute workload that is capable of being relocated to determine a potential energy consumption needed in watts and a length of time needed to perform the compute task;
determine for each of a plurality of available data center sites respective energy prices per watt of energy provided by the sites and time durations for each of the respective energy prices; and
relocate the compute task to a second data center site of the plurality of data center sites having a lowest energy price from a first of the data center sites that the compute job is assigned to if:
a total cost to relocate the compute job to the second site and complete the compute job at the second site energy price is lower than a cost to complete the compute job at the first site energy price;
the second site time energy price duration is long enough to complete the compute task if moved to the second site; and
the compute job workload of the first site will remain stable for a minimum required thrashing prevention threshold amount of time after moving the compute job to the second site; or
moving the compute job to the second site will not exceed a specified threshold maximum number of moves for the compute job.

20. The article of manufacture of claim 19, wherein the computer readable program code instructions, when executed by the computer processing unit, further cause the computer processing unit to halt and bring the compute job to a quiescent state before relocating the compute job to the second site.

21. The article of manufacture of claim 20, wherein the computer readable program code instructions, when executed by the computer processing unit, further cause the computer processing unit to relocate the compute job to the second site if the compute job is not able to be completed at the first site, by pausing the compute job and completing a remainder of the compute job at the second site after the relocating.

22. The article of manufacture of claim 21, wherein the computer readable program code instructions, when executed by the computer processing unit, further cause the computer processing unit to choose the second site as a function of determining the second site is an optimum data center location for conducting the compute task.

23. The article of manufacture of claim 22, wherein the computer readable program code instructions, when executed by the computer processing unit, further cause the computer processing unit to relocate the compute job to the second site as a function of stabilizing the compute task workload among the plurality data center sites.

24. The article of manufacture of claim 23, wherein the computer readable program code instructions, when executed by the computer processing unit, further cause the computer processing unit to re-evaluate the relocation of the compute task as often as energy costs change at any of the plurality of data sites.

* * * * *